United States Patent

Burda

[11] Patent Number: 5,479,434
[45] Date of Patent: Dec. 26, 1995

[54] DOUBLE-HEARTH ARC FURNACE FOR PREHEATING SCRAP MATERIAL AND METHOD OF OPERATING THE SAME

[75] Inventor: Raymond J. Burda, Cheswick, Pa.

[73] Assignee: Mannesmann Aktiengesellschaft, Dusseldorf, Germany

[21] Appl. No.: 212,581

[22] Filed: Mar. 11, 1994

[51] Int. Cl.$^6$ ................................................ F27D 23/00
[52] U.S. Cl. .......................... 373/78; 373/80; 75/10.32; 266/144
[58] Field of Search .................... 373/78, 80, 84, 373/68, 43, 2, 60, 71–72, 79; 75/10.38, 10.53, 508, 10.34, 10.36, 10.32; 266/142, 144, 168, 207

[56] References Cited

U.S. PATENT DOCUMENTS

| | | | |
|---|---|---|---|
| 4,531,971 | 7/1985 | Sugiura et al. | 75/13 |
| 4,695,316 | 9/1987 | Cartlidge | 373/7 |
| 5,252,120 | 10/1993 | Finkl et al. | 373/60 |
| 5,264,020 | 11/1993 | Ehle et al. | 373/80 |

*Primary Examiner*—Tu Hoang
*Attorney, Agent, or Firm*—Cohen, Pontani, Lieberman & Pavane

[57] ABSTRACT

A double furnace installation having two arc furnaces connected via a line, a power supply, a device for charging material, and an arrangement for extraction and purification of gas is operated by connecting a first one of the furnaces with the power supply for melting a charge located therein, isolating a second one of the furnaces from the power supply, charging the second furnace with charging material, and closing the second furnace with a cover. Flue gas generated during a melting phase of the first furnace is sucked therefrom and introduced into the second furnace through a first interior bay region of the second furnace. The flue gas entering the second furnace in this manner passes substantially horizontally through the charging material in the second furnace because it is sucked therefrom through a second interior bay region disposed diametrically opposite the first interior bay region.

10 Claims, 1 Drawing Sheet

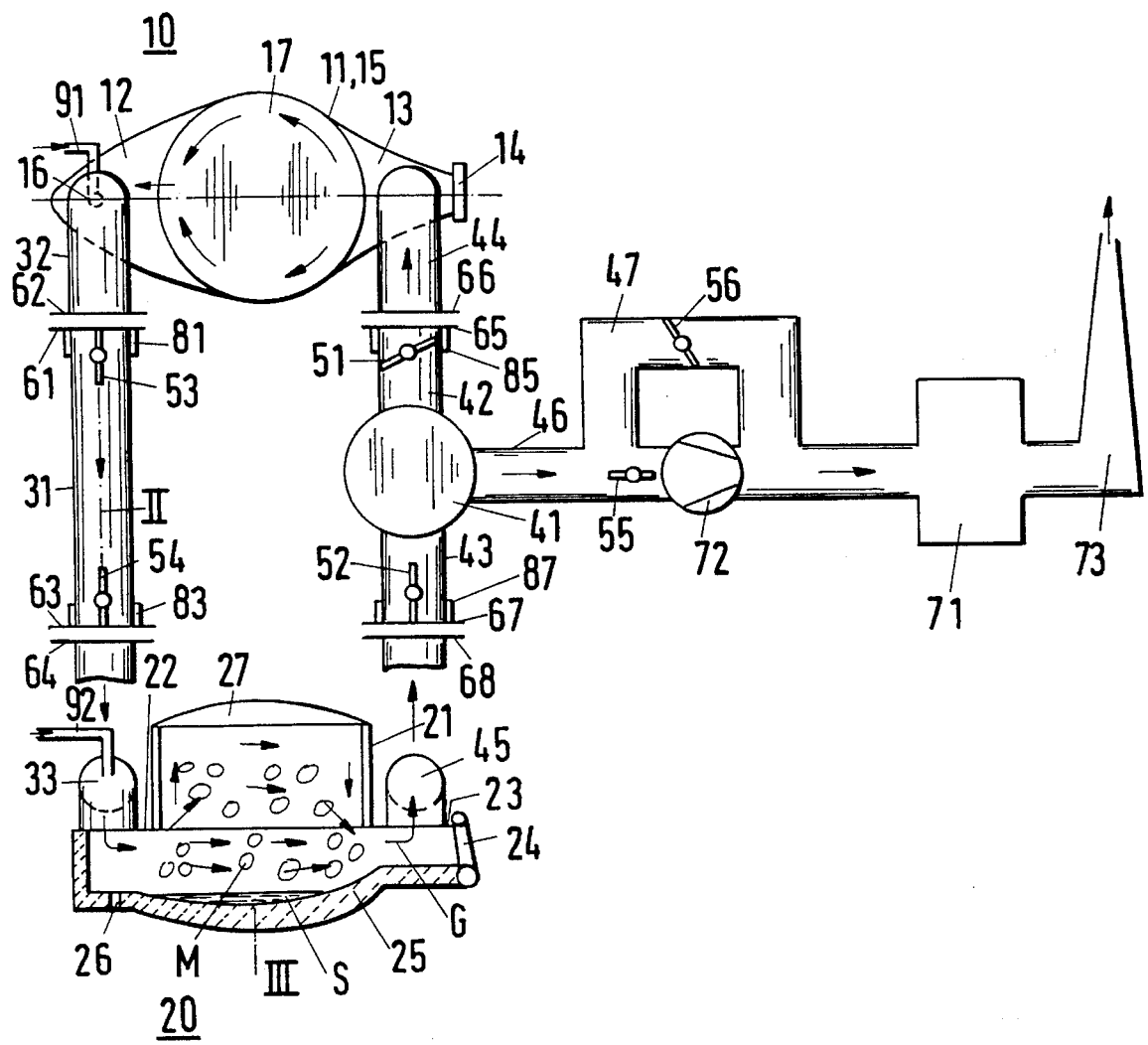

DOUBLE-HEARTH ARC FURNACE FOR PREHEATING SCRAP MATERIAL AND METHOD OF OPERATING THE SAME

BACKGROUND OF THE INVENTION

1. Field of the Invention

This invention relates generally to the melting of scrap metal, and more particularly, to a method and apparatus for preheating scrap metal in a double-hearth arc furnace, especially for the production of steel.

2. Description of the Prior Art

In steel production, it is desirable to preheat charge material, such as scrap metal for example, before they are inserted into the furnace. In an electric arc furnace, this is typically accomplished by utilizing a feed line to deliver hot waste gases of the furnace into contact with scrap material disposed in a cage or basket. After the heat of the waste gas has been advantageously utilized in this manner, it is subsequently supplied to a gas purification station for treatment and subsequent release into the atmosphere.

Another conventional technique for preheating the scrap material is to arrange two arc furnaces next to one another and to fill one furnace, which is in the process of preparing molten material, with scrap beforehand and thereby use the furnace as a preheating chamber. In U.S. Pat. No. 4,531,971, for example, there is disclosed a double furnace installation in which a first of the two furnaces is supplied with electric current in order to melt the charge contained therein and the second furnace is completely isolated from the main power supply. The isolated second furnace is charged with scrap and vessel cover thereof is closed. Subsequently, the flue gas generated by the first or operating furnace is withdrawn by vacuum and introduced into the isolated furnace via a connection line provided between the two furnaces.

In accordance with the process disclosed in the aforementioned patent, the flue gas is sucked out of the operating furnace via the laterally disposed cover thereof and is blown onto the scrap from the direction of its laterally disposed cover. As a result, only a portion of the scrap is exposed to the heated gas, and, consequently, only a portion of the sensible heat of the flue gas is taken up by this scrap.

Accordingly, it is an object of the present invention to avoid the disadvantages mentioned above and to provide, with the use of simply designed structural component parts, a low-maintenance and highly reliable steel making plant with a double furnace arrangement.

It is another object of the present invention to provide a process and apparatus for preheating scrap in a double hearth furnace installation in which the flue gas is transported from the operating furnace to the isolated furnace through easily maintained lines and in which the flue gas is brought into intimate contact with the scrap while avoiding the cold zones.

SUMMARY OF THE INVENTION

The aforementioned objects, as well as others which will become apparent to those skilled in the art, are achieved in a double furnace arrangement including two furnace vessels which can be closed by respective covers. First and second connection lines connects together the two furnace vessels, the first connection line connecting the vessels to a suction device and, ultimately, to a gas purification system. Flow shut-off valves control the direction of gas flow in the connection lines.

The double furnace installation is operated by energizing one of the two furnaces with an electric current for melting the charge located therein while the other furnace is completely isolated from the power supply. The isolated furnace is charged with scrap material and its cover is subsequently closed. The flue gas is then sucked out of the energized furnace, passing through the isolated furnace via one of the connection lines interconnecting the two furnaces. While the flue gas is being sucked through the isolated furnace, the flue gas connection between the energized furnace and the gas purification system is interrupted by the flow shut-off valve juxtaposed therebetween. At the same time, the energized furnace takes on feed air in the region of the cover.

According to the invention, the flue gas is introduced into the isolated furnace by an inlet line positioned in a first bay region thereof. The flue gas is passed substantially horizontally through the scrap column and is withdrawn by suction through an outlet line communicating with a second bay region located directly opposite the first bay region. In accordance with one embodiment of the inventive method, flue gas is introduced into the isolated furnace via an interior bay region defined in the region of the tap and is withdrawn by suction from a second interior bay region in the region of the slag door. Alternately, however, the flue gas may be introduced in the region of the slag door and withdrawn in the tap bay region. That is, so long as the flow is horizontal, its direction is not critical to the operation of the invention. Specifically, because of the furnace shape and the opposed, relatively low positioning of the inlet and outlet lines, the flue gas flows uniformly through the full breadth of the scrap. The improved flow pattern results in a substantial increase in the amount of heat released by the gas and absorbed by the scrap.

The flue gas outlets are advantageously configured so that they do not entrain slag particles, in the case of the operating furnace, and so that lighter pieces of scrap are prevented from being drawn out, in the case of the isolated furnace. For this purpose, the lower portion of each furnace vessel is preferably configured, in cross section, with a circular central region and a pair of oppositely disposed arcuate protuberances or bay regions. One of the bay regions defines the run-off tap and the other a slag door of each furnace. Pipe elbows are coupled to the upper surfaces of the bay regions to provide flue gas inlet and outlet connections, respectively, with the inlet opening being provided directly over the run-off tap and the outlet opening being provided proximate the slag door.

The double furnace installation is constructed with a minimum of parts. Moreover, piping design and layout is simple to construct, easy to maintain, and advantageous with respect to fluidics. A maximum amount of flue gas heat is released and utilized without appreciable losses and without consuming unnecessary amounts of energy during transportation of the gas.

The introduction of hot gas in the bay region where the run-off tap is located is particularly advantageous because the critical region of an arc furnace provided with a bay forestructure reaches and maintains a high temperature very rapidly. To increase heat generation, it is preferable to mix the flue gas with air and/or oxygen before it enters the furnace filled with scrap.

The various features of novelty which characterize the invention are pointed out with particularity in the claims annexed to and forming a part of the disclosure. For a better understanding of the invention, its operating advantages, and specific object attained by its use, reference should be had to the drawing and descriptive matter in which there are illustrated and described preferred embodiments of the invention.

BRIEF DESCRIPTION OF THE DRAWINGS

A better understanding of the present invention will be facilitated by reference to the detailed description below in combination with the annexed FIG. 1 which is a schematic representation of a double-hearth furnace installation constructed in accordance with an illustrative embodiment of the present invention.

DETAILED DESCRIPTION OF THE PREFERRED EMBODIMENTS

With reference to the FIGURE, there is shown a double hearth furnace installation having a first furnace 10 and a second furnace 10. A power supply (not shown) having a single main power feed is connected to the two furnaces. A conventional automatic transfer switch device (not shown) may be utilized to alternately disconnect one furnace from the power supply so as to enable an unimpeded operation of the other furnace. That is, the furnace electrodes are switched electrically so that only one furnace is energized (i.e., operates) at a given time, while the other one is completely isolated from the power supply. The electrical components and circuitry have been omitted from the drawing as it is contemplated that the use and arrangement of such components is well known to those skilled in the art.

As seen in the FIGURE, furnace 20, which is shown in elevation perspective, includes a lower vessel section 25 and an upper vessel section 21. The upper vessel section 21 is covered by cover 27. Furnace 10, which is shown in plan view perspective, is similarly constructed and includes a lower vessel section 15 and a upper vessel section 11 capped by cover 17.

In accordance with the present invention, the lower portion of the vessel of each furnace is preferably configured, in cross section, with a central region and a pair of oppositely disposed lobes in the form of arcuate protuberances or bulges. With particular reference to furnace 10, it can be seen that a molten material run-off tap 16 is provided in the base surface of a first bulge region 12 thereof. On the opposite side of the central region of vessel section 15 is a second bulge region 13 having positioned thereat slag door 14.

The construction of furnace 20 is identical to that of furnace 10. Thus, as can be seen in the FIGURE, run-off tap 26 is provided in the base surface of first bulge region 22 and slag door 24 is positioned at the outer end of second bulge region 23.

Tap pipe elbows 32,33 having flanges 62,64 at their opening side are arranged at the furnace bulge regions across from taps 16 and 26, respectively. When the furnaces are not in their tilted position, these pipe flanges can be aligned with complementary flanges 61,63 connected with a rigid conduit piece 31 and can be closed in a gas tight manner by sliding sleeves 81,83 which press against them.

Pipe elbows 44,45 with flanges 66,68 are arranged at the slag bays 13,23 at a right angle to the openings which are inclined through the furnace axis I. The flanges 66,68 can be brought into a contacting connection with flanges 65,67 arranged at displaceable sleeves 85,87. The sleeves 85 and 87 enclose the opening of pipe sections 42,43, which pipe sections are connected to combustion chamber 41.

A waste gas line 46, in which is provided a suction device 72 encircled by a bypass line 47, is connected with the combustion chamber 41 and leads to a stack 73 via a gas purification arrangement 71.

The openings of the rigid conduit piece can be blocked by shut-off valves 53 and 54, and pipe sections 42 and 43 can be blocked by shut-off valves 51 and 52, respectively. Moreover, the openings of the waste gas line 46 prior to the suction device can be blocked by valve 55 and those of the bypass line 47 can be blocked by valve 56.

In the FIGURE, furnace 20 is filled with a burden M, a sump S being indicated in the lower vessel section 25 thereof. Furnace 20 is completely isolated from the main electric power supply, while the furnace 10 is in the operating phase. The developing gas (shown by the arrows) is sucked out of the system by suction pump 72, treated within purification system 71, and released into the atmosphere via stack 73. The flue gas is sucked out of the slag bay 23 of furnace 20 through the opened valve 52 in the pipe section 43 and is directed into combustion chamber 41. The prevailing vacuum pressure causes the flue gas to be directed through elbow 33 into bay region 22 and then through the burden located into the furnace vessel defined by upper and lower vessel sections 21 and 25, respectively. As the flue gas passes through the burden, scrap in the illustrative example, the sensible heat thereof is absorbed by the scrap.

Injector pipes 91 and 92, which are connected to a source of air or oxygen (not shown), are connected to pipe elbows 32 and 33, respectively and are thus in fluid communication with the interior of a corresponding bay region 12 or 22. The flue gas which is directed though respective opened valves 53 and 54 via the rigid conduit member interconnecting pipe elbows 32 and 33 is withdrawn from furnace 10, while the same is in the operating or melting phase, and is burned subsequently by air or oxygen fed via injector 92. Infiltrated or secondary air reaches furnace 10 via a slot between cover 17 and upper vessel section 11 and through a region of flange 66 of pipe elbow 44 provided at the slag bay.

Those skilled in the art will recognize changes and modifications which can be made to the present invention without departing from its spirit or scope. For example, although the direction of flow is characterized above as involving introduction into the run-off tap bay region and suction from the slag door bay region, it is equally possible to reverse the flow, so long as the flow is substantially horizontal. Thus, in accordance with the present invention, it is only necessary to provide regions of introduction and removal which are substantially opposite one another and at approximately the same vertical position. Accordingly, it is intended that the scope of the present invention limited only by the appended claims.

The invention is not limited by the embodiments described above which are presented as examples only but can be modified in various ways within the scope of protection defined by the appended patent claims.

What is claimed is:

1. A process for operating a double furnace installation having two arc furnaces connected via a line, a power supply, a device for charging material, and an arrangement for extraction and purification of gas, said each arc furnace has a run-off tap and a slag door and each defining, on opposite sides thereof, first and second interior bay regions disposed over said tap and proximate said slag door respectively and diametrically opposite to one another comprising the steps of:

—connecting a first one of the furnaces with the power supply for melting a charge located therein;

—isolating a second one of the furnaces from the power supply;

—charging the second furnace with charging material;

—closing the second furnace with a cover;

—sucking flue gas generated during a melting phase out of the first furnace;

—introducing the flue gas into the second furnace through said first interior bay region of said second furnace;

—passing the introduced flue gas along a substantially horizontal path through the charging material in the second furnace;

—sucking the flue gas from the second furnace through said second interior bay region of said second furnace; and mixing the flue gas sucked from the second furnace with oxygen to enhance combustion.

2. A process according to claim 1, wherein the charge material in said second furnace is scrap.

3. A processing according to claim 1, wherein flue gas is introduced into the second furnace through a first interior bay region of the second furnace and sucked therefrom through a second interior bay region disposed diametrically opposite the first interior bay region.

4. A double furnace arrangement, comprising:

—first and second tiltable furnace vessels, each of said vessels having an interior run-off tap region and an interior slag door region defining a first and second interior bay regions respectively at opposite sidewalls thereof;

—a connection line in fluid communication with said interior run-off tap and slag door region of each of said first and second tiltable furnace vessels respectively;

—first and second conduits for interconnecting the furnace vessels, said first conduit including a combustion chamber having first and second flanged pipe sections connected thereto with first and second shut off valve means provided in said first and second pipe sections, respectively, and said second conduit having a flange at each end and including third and fourth shut-off valve means; and —means for releasably coupling said connection lines to flanges of said conduits for permitting tilting of each furnace.

5. A furnace according to claim 4, wherein said connection lines are pipe elbows and wherein each of said interior slag door region is configured in cross section as a bulge dimensioned and arranged to prevent splashed slag from caking, a pair of elbows being respectively connected proximate a slag door of the furnace.

6. A furnace according to claim 4, further including means in fluid communication with each of said connection lines in said interior run-off tap region of each furnace vessel for injecting oxygen into flue gas passing therethrough.

7. A furnace according to claim 4, wherein said means for releasably coupling includes a respective sleeve secured to a corresponding flange, each sleeve being dimensioned to enclose a corresponding conduit opening and connection line opening and being displaceable relative thereto to expose a flange interface.

8. A double furnace arrangement, comprising:

—first and second tiltable furnace vessels, each of said vessels having a run-off tap and a slag door and each defining, on opposite sides thereof, first and second interior bay regions disposed over said tap and proximate said slag door, respectively;

—connection lines in fluid communication with said bay regions;

—first and second conduits for interconnecting the furnace vessels, said first conduit including a combustion chamber having first and second flanged pipe sections connected thereto with first and second shut off valve means provided in said first and second pipe sections, respectively, and said second conduit having a flange at each end and including third and fourth shut-off valve means; and —means for releasably coupling said connection lines to flanges of said conduits for permitting tilting of each furnace.

9. A furnace according to claim 8, wherein said connection lines are pipe elbows and wherein one of said elbows is connected to said second bay region.

10. A process for operating a double furnace installation having two arc furnaces connected via a line, a power supply, a device for charging material, and an arrangement for extraction and a purification of gas, said each arc furnace has a run-off tap and a slag door and each defining, on opposite sides thereof, first and second interior bay regions disposed over said tap and proximate said slag door respectively and diametrically opposite to one another comprising the steps of: connecting a first one of the furnaces with the power supply for melting a charge located therein; isolating a second one of the furnaces from the power supply; charging the second furnace with charging material; closing the second furnace with a cover; sucking flue gas generated during a melting phase out of the first furnace; introducing the flue gas into the second furnace through a first interior bay region of the second furnace; passing the introduced flue gas along a substantially horizontal path through the charging material in the second furnace; and sucking the flue gas from the second furnace through a second interior bay region.

* * * * *